United States Patent [19]

Sartori et al.

[11] 4,112,051

[45] Sep. 5, 1978

[54] PROCESS AND AMINE-SOLVENT ABSORBENT FOR REMOVING ACIDIC GASES FROM GASEOUS MIXTURES

[75] Inventors: Guido Sartori, Linden, N.J.; Frederic Leder, Corona Del Mar, Calif.

[73] Assignee: Exxon Research & Engineering Co., Linden, N.J.

[21] Appl. No.: 862,195

[22] Filed: Dec. 19, 1977

Related U.S. Application Data

[63] Continuation-in-part of Ser. No. 590,427, Jun. 26, 1975, abandoned.

[51] Int. Cl.$^2$ ............................................. B01D 53/34
[52] U.S. Cl. .................................... 423/223; 423/226; 423/228; 423/238; 423/243; 252/189
[58] Field of Search ................ 423/220, 223, 226–228, 423/232, 233, 236, 243; 252/189; 260/584 R

[56] References Cited

U.S. PATENT DOCUMENTS

| | | | |
|---|---|---|---|
| 1,783,901 | 12/1930 | Bottoms | 423/228 |
| 2,139,122 | 12/1938 | Hass et al. | 260/584 R |
| 2,139,124 | 12/1938 | Hass et al. | 260/584 R |
| 2,176,441 | 10/1939 | Ulrich et al. | 423/228 |
| 2,718,454 | 9/1955 | Wylie | 423/229 |
| 3,039,251 | 6/1962 | Kamlet | 423/226 |
| 3,161,461 | 12/1964 | Deal, Jr. et al | 423/226 |
| 3,637,345 | 1/1972 | Leder | 423/228 |
| 3,681,015 | 8/1972 | Gelbem et al. | 423/228 |
| 3,716,620 | 2/1973 | Deschamps et al. | 423/228 |
| 3,793,434 | 2/1974 | Leder | 423/228 X |
| 3,856,921 | 12/1974 | Shrier et al. | 423/229 X |

FOREIGN PATENT DOCUMENTS

| | | | |
|---|---|---|---|
| 1,058,304 | 2/1967 | United Kingdom | 423/228 |
| 1,238,696 | 7/1971 | United Kingdom | 423/228 |

OTHER PUBLICATIONS

Sharma, "Kinetics of Reactions of Carbonyl Sulfide and Carbon Dioxide with Amines and Catalysis by Bronsted Bases of the Hydrolysis of COS," Transaction Faraday Society, vol. 61, pp. 681–688, 1965.

Frahn et al. "Paper Ionophoresis of Amino Compounds, Formation of Carbamates and Related Reactions," Aust. J. Chem, vol. 17, pp. 256–273, 1964.

Shrier, "Carbon Dioxide Absorption into Amine-Promoted Potash Solutions," Ind. & Eng. Chem. Fundamentals, vol. 8, pp. 415–423, 1969.

Jensen, "Studies on Carbamates," Acta Chemica Scandinavica, vol. 11, pp. 499–505, 1957.

Danckwerts et al., "The Absorption of Carbon Dioxide into Solution of Alkalis and Amines, The Chemical Engineer. Oct. 1966, pp. 244–280.

*Primary Examiner*—Earl C. Thomas
*Attorney, Agent, or Firm*—Albert P. Halluin

[57] ABSTRACT

Acidic gases are substantially removed from a normally gaseous mixture by a process comprising contacting the normally gaseous mixture with an amine-solvent liquid absorbent comprising (i) an amine comprised of at least about 50 mol % of a sterically hindered amine, and (ii) a solvent for said amine mixture which is also a physical absorbent for said acidic gases. The liquid absorbent may also include up to about 35 weight percent water.

34 Claims, 2 Drawing Figures

PROCESS AND AMINE-SOLVENT ABSORBENT FOR REMOVING ACIDIC GASES FROM GASEOUS MIXTURES

CROSS REFERENCE TO RELATED APPLICATIONS

This application is a continuation-in-part of U.S. application Ser. No. 590,427, filed June 26, 1975, now abandoned. This application is related to U.S. application Ser. No. 750,520, filed Dec. 14, 1976, now U.S. Pat. No. 4,094,957, issued June 13, 1978; U.S. application Ser. No. 768,420, filed Feb. 14, 1977; and U.S. application Ser. No. 768,421, filed Feb. 14, 1977.

BACKGROUND OF THE INVENTION

1. Field of the Invention

This invention relates to an improved process for removing carbon dioxide containing acidic gases from normally gaseous mixtures containing them and more particularly relates to a process of accomplishing substantial removal of these acidic gases from normally gaseous mixtures by contacting the normally gaseous mixtures with a solution containing a sterically hindered amine and a solvent for said amines.

2. Description of the Prior Art

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid gas scrubbing processes known in the art can be generally broken into three categories.

The first category is generally referred to as the aqueous amine process where relatively concentrated amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressure of the $CO_2$ and other gases are low.

A second category is generally referred to as the aqueous base scrubbing process or "hot pot" process. In this type of process a small level of an amine is included as an activator for the aqueous base used in the scrubbing solution. This type of process is generally used where bulk removal of an acid gas, such as $CO_2$, is required. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

The present invention pertains to an improved process for practicing the third category of the acid gas scrubbing processes described above, namely, the nonaqueous solvent process where up to 50% or more of the same absorbent is dissolved in the liquid phase containing a solvent for the amine.

Many industrial processes for removal of carbon dioxide containing acidic gases use regenerable solutions of amines which are continuously circulated between an absorption zone where the acidic gases, e.g., carbon dioxide, are absorbed and a regeneration zone where the amine containing absorption solution which is saturated with the acidic components is desorbed usually by steam stripping. The capital cost of these acid gas scrubbing processes is generally controlled by the size of the absorption and regeneration towers, the size of the reboilers for generating stripping steam, and the size of the condensers which condense spent stripping steam so that condensate may be returned to the system to maintain proper water balance.

The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the above-described processes for removing acidic gases from gaseous mixtures. Some of these improvements are described below.

U.S. Pat. No. 2,360,861 teaches the use of cyclic tetramethylene sulfones for separating mixtures of organic compounds and U.S. Pat. Nos. 2,385,704 and 3,475,329 teach the extraction of $SO_2$ with cyclotetramethylene sulfones.

U.S. Pat. No. 3,039,251 to Kamlet teaches the use of certain sulfones, such as cyclotetramethylene sulfone (i.e. sulfolane) and the homologues thereof, alone or in combination with various alkanolamines for removal of hydrogen sulfide, mercaptans and/or carbon dioxide from normally gaseous mixtures. According to this patent, one is enabled to purify and dehydrate natural and synthetic gases, such as natural gas, synthesis gas, producer gas, coke oven gas, etc. The amines disclosed in this patent include monoethanolamine, diethanolamine, triethanolamine, N-methyldiethanolamine and alpha-aminopropionic acid.

A number of improvements and variations on the process taught by U.S. Pat. No. 3,039,251 have appeared in the patent literature. These improvements generally involve the use of specific amines or classes of amines, addition of other additives, such as iodine or water, and the use of other solvents, such as amides in place of the sulfones, etc. Examples of the patents which disclose some of these improvements are as follows:

| U.S. Pat. Numbers | |
|---|---|
| 3,161,461 | 3,642,431 |
| 3,347,621 | 3,653,809 |
| 3,352,631 | 3,656,887 |
| 3,363,989 | 3,656,905 |
| 3,377,138 | 3,658,462 |
| 3,463,603 | 3,681,015 |
| 3,502,428 | 3,716,620 |
| 3,532,467 | 3,719,749 |
| 3,551,102 | 3,764,665 |
| 3,551,106 | 3,767,766 |

-continued

| U.S. Pat. Numbers | |
|---|---|
| 3,553,936 | 3,777,010 |
| 3,565,573 | 3,801,708 |
| 3,577,221 | 3,843,512 |
| 3,618,331 | 3,928,548 |
| 3,630,666 | 3,965,244 |
| 3,632,519 | 3,965,253 |

| British Pat. Specification Numbers | |
|---|---|
| 957,260 | 1,131,989 |
| 972,140 | 1,153,786 |
| 997,169 | 1,158,976 |
| 1,058,304 | 1,238,696 |
| 1,118,687 | |

| Canadian Pat. Numbers |
|---|
| 951,494 |
| 729,090 |

| Dutch Pat. Specification Numbers |
|---|
| 67/06653 |
| 73/12490 |
| 73/12491 |

| German Offenlegungschrift Numbers |
|---|
| 1,542,415 |
| 2,422,581 |
| 2,433,078 |

None of these patents or patent publications disclose, teach or suggest the use of sterically hindered amines with a solvent such as sulfolane or the unexpected benefits of the instant invention described herein. British Patent Specification Nos. 972,140, 1,058,304 and 1,238,696 and U.S. Pat. No. 3,716,620, however, are of particular interest with respect to the instant invention and, accordingly, are discussed in more detail hereinafter.

British Patent Specification No. 972,140 (which generally corresponds to U.S. Pat. No. 3,161,461) discloses a process for removing acid gases from gaseous stream by contacting the gaseous streams with a composition comprising organic solvent, such as sulfolane, and at least one amine having a weakly basic character in the range of $pK_b$ at 25° C. of 3–14, e.g., diethanolamine.

British Patent Specification No. 1,058,304 describes a process for removing acid gases from gaseous streams by contacting the gaseous streams with an aqueous solution comprising sulfolane and a secondary alkanolamine or morpholine or derivatives of morpholine, e.g., 2,6-dimethylmorpholine, 2,6-diethylmorpholine, 2,3,5,6-tetraethylmorpholine, 2-methylmorpholine, 2-ethylmorpholine and 2-methyl-6-ethylmorpholine. The patent specification does not teach the concept of improved working capacity as defined hereinafter or the use of sterically hindered alkanol-amines.

British Patent Specification No. 1,238,696 discloses a process for removing acid gases from gaseous streams by contacting the gaseous streams with a composition comprising an organic solvent and an alkanolamine such as cyclohexylamino ethanol. The use of sterically hindered amines to improve working capacity in a gas scrubbing process defined herein are not specifically taught in this patent specification.

U.S. Pat. No. 3,716,620 discloses a process for removing acid gases from gaseous streams by contacting the gaseous streams with a composition comprising a solution of iodine in an organic solvent which also contains an amine. Among the solvents disclosed, there are included the sulfones, e.g., sulfolane. Among the amines, there are disclosed alkanolamines with primary, secondary or tertiary amino groups having 2 to 12 carbon atoms and 1 to 3 amino groups, e.g., mono-, di- and triethanolamines, N-methyl diethanolamine, N-cyclohexyldipropanolamine and diisopropanolamine.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., Trans. Faraday Soc., 61, 681–8 (1965) described the kinetics of reaction of $CO_2$ and COS with 38 amines, some of which are sterically hindered amines. Other researchers have attributed relatively poor absorption rates of $CO_2$ by amines to steric hindrance. See, for example, J. L. Frahn and J. A. Mills, Aust. J. Chem., 17, 256–73, 263 (1964) and M. B. Jensen, Acta Chemica Scandinavica, 11, 499–505 (1957).

Shrier and Danckwerts, Ind. Eng. Chem. Fundamentals, 8, 415 (1969) discussed the use of amines as promoters for aqueous carbon dioxide absorption solutions. However, these researchers only ran initial absorption rate experiments and did not recognize the unique capacity advantages obtained by using sterically hindered amines in an acid gas scrubbing process. Also of interest is Danckwerts and Sharma, The Chemical Engineer, Oct. 1966, pp. 244–280.

U.S. Pat. No. 1,783,901 to Bottoms teaches the use of aliphatic amine compounds including alkanol amines such as triethanolamine in an aqueous amine scrubbing process. The patent does not mention the use of sterically hindered amines or their use in combination with organic physical absorbents such as sulfolane.

U.S. Pat. Nos. 2,139,122, 2,139,123 and 2,139,124 to Haas et al. disclose amino alcohols (U.S. Pat. No. 2,139,122 discloses 2-amino-2-methyl-1-propanol) and in page 2, column 2, it is disclosed that these aminoalcohols, due to their basic nature may be utilized to absorb acids such as hydrogen sulfide or carbon dioxide from industrial gases. There is no mention of using the disclosed amino alcohol in combination with organic physical absorbents such as sulfolane.

U.S. Pat. No. 2,176,441 to Ulrich et al. teaches the use of amino acids having a primary, secondary or tertiary amino group and at least two nitrogen atoms to remove acidic gases. The patentees provide various general formulae for the amino acids taught to be useful in the acid gas scrubbing process. While certain "sterically hindered amines" can be derived by proper choice of substituent groups in the general formulae there is no teaching that these amines will achieve any unexpected results, such as improved regeneration rates coupled with high rates of absorption.

There are a number of patents which disclose the use of various amines as "activators" in an alkaline scrubbing solution wherein the primary absorbent is an alkaline salt such as potassium carbonate. Some of these processes are described in U.S. Pat. Nos. 2,718,454, 3,144,301, 3,637,345, 3,793,434, 3,848,057, 3,856,921, 3,563,695, 3,563,696 and 3,642,430, as well as some other patents such as Belgian Pat. No. 767,105; British Pat. Nos. 1,063,517, 1,218,083 and 1,305,718.

In the prior art processes discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient.

It has now been discovered that sterically hindered amines unexpectedly improve the efficiency, effectiveness and working capacity of the acid gas scrubbing processes in all three of the above-mentioned process categories. In the case of the amine-solvent process, the sterically hindered amines are capable of providing an improved cyclic working capacity over diisopropanolamine. As explained in greater detail hereinafter, it is postulated that the increase in cyclic capacity observed with the sterically hindered amines is due to the instability of their carbamates. In that respect, sterically hindered amines are similar to tertiary amines. Tertiary amines are not used on a commercial scale for carbon dioxide containing gas scrubbing due to their low rates of absorption and desorption.

SUMMARY OF THE INVENTION

In one embodiment of the present invention there is provided a process for the substantial removal of $CO_2$ in acidic gases from normally gaseous feed containing $CO_2$, which comprises contacting said normally gaseous feed containing $CO_2$ with an amine-solvent liquid absorbent comprising:

(a) an amine comprised of a sterically hindered amine, and (b) a solvent, preferably an organic solvent for said amine mixture which is a physical absorbent for said acidic gases.

In another embodiment of the present invention, there is provided an amine-solvent liquid absorbent comprising:

(a) an amine comprised of:
  (i) a sterically hindered amine, and,
(b) a solvent for said amine mixture.

The liquid absorbent composition of the present invention may optionally contain up to about 35 weight % of water, preferably up to 25 weight % water and more preferably 10 to about 20 weight % water. The water in the liquid absorbent is used to generate steam (to help the heat balance of the overall process), reduce the viscosity of the solvent, particularly sulfolane and glycol type solvents) and assist the solubility of some amine-acid gas reaction products.

The sterically hindered amines, the use of which constitutes the novelty of the instant process and composition of matter, are compounds containing at least one secondary amino group attached to either a secondary or tertiary carbon atom or a primary amino group attached to a tertiary carbon atom. These amines are selected to be at least partly soluble in the particular solvent used. The sterically hindered amine will preferably additionally comprise one or more water-solubilizing groups which may be selected from the group consisting of amino groups, i.e. additional sterically hindered amino groups, or non-sterically hindered amino groups, e.g., primary amino groups or hydroxy groups. At least one nitrogen atom will have a sterically hindered structure described above.

The preferred sterically hindered amines useful in combination with the solvents of the present invention include those amines which contain at least one secondary amino group which is part of a ring and is attached to either a secondary or tertiary carbon atom or a primary amino group attached to a tertiary carbon atom. Typical preferred sterically hindered amines include the amino alcohols, e.g., the 2-piperidine alkanols such as 2-piperidine methanol and 2-piperidine ethanol, 2-amino-2-methyl-1-propanol, 2-amino-2-methyl-1-butanol, 3-amino-3-methyl-2-pentanol and 3-amino-3-methyl-1-butanol.

The terms "solvent" and "organic solvent" as used herein are meant to include those materials which appear to act in a purely physical manner, absorbing acidic gases physically without the formation of any apparent reaction product. The terms "solvent" and "organic solvent" are to be contrasted with the so-called "chemical solvents" which involve the formation of salts or other decomposable reaction products with acidic gases.

DESCRIPTION OF THE PREFERRED EMBODIMENTS

The term "acidic gases" is meant to include $CO_2$, $H_2S$, $SO_2$, $SO_3$, $CS_2$, $HCN$, $COS$ and the oxygen and sulfur derivatives of $C_1$ to $C_4$ hydrocarbons in various amounts as they frequently appear in gaseous mixtures. These acidic gases which are generally $CO_2$, $H_2S$ and $COS$ may be present in trace amounts within a gaseous mixture or in major proportions, the major proportion preferably being $CO_2$ for the purpose of the present invention.

The contacting of the amine-solvent liquid absorbent and the $CO_2$ containing acidic gases may take place in any suitable contacting tower. In such processes, the normally gaseous mixture from which the $CO_2$ containing acidic gases are to be removed may be brought into intimate contact with the absorbing solution using conventional means, such as a tower packed with, for example, ceramic rings or saddles or with bubble cap plates or sieve plates, or a bubble reactor.

In a preferred mode of practicing the invention, the absorption step is conducted by feeding the normally gaseous feed into the base of the tower while fresh and/or regenerated absorbing solution (i.e. the liquid absorbent of the present invention) is fed into the top. The normally gaseous mixture freed largely from $CO_2$ containing acidic gases emerges from the top. Preferably, the temperature of the absorbing solution during the absorption step is in the range from about 20° to about 100° C., and more preferably from 40° to about 60° C. The pressure of the normally gaseous mixture feed will preferably be in the range from about 1 to about 2000 psig, and more preferably in the range from about 100 to about 1000 psig. The contacting takes place under conditions such that the acidic gases, e.g., $CO_2$ possibly in combination with $H_2S$ and/or COS are absorbed by the solution. During the absorption the solution is maintained in a single phase.

The liquid absorbent composition comprising the amine mixture and solvent which is saturated or partially saturated with gases, such as $CO_2$ and $H_2S$, may be regenerated so that it may be recycled back to the absorber. The regeneration should also take place in a single liquid phase. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step should be in the range from about 50° to about 170° C., and preferably 80° to 150° C. The absorbing solution, after being cleansed of at least a portion of the acid bodies, may be recycled back to the absorbing tower. Makeup absorbent may be added as needed.

For example, during desorption, the acidic gases, e.g., $CO_2$ possibly in combination with $H_2S$ and/or COS solutions from the high pressure absorber is sent first to a flash chamber where steam and some $CO_2$ and the $H_2S$ and/or COS are flashed from solution at low pressure. The amount of $CO_2$ containing acidic gases flashed off will in general be about 35 to 40% of the net $CO_2$ containing acidic gases recovered in the flash and stripper. Solution from the flash drum is then steam stripped in the packed or plate tower, stripping steam having been generated in the reboiler in the base of the stripper. Pressure in the flash drum and stripper is usually 1 to about 50 psia, preferably 15 to about 30 psia, and the temperature is in the range from about 50° to about 170° C., preferably 80° to about 150° C. Stripper and flash temperatures will, of course, depend on stripper pressure, thus at about 15 to 30 psia stripper pressures, the temperature will be about 80° to about 150° C. during desorption.

In the most preferred embodiment of the present invention, substantially complete removal of carbon dioxide in acidic gases from normally gaseous feeds is accomplished by a process comprising:

(a) contacting said normally gaseous feed with a scrubbing solution comprising:

(i) an amine comprising a sterically hindered amino alcohol wherein said sterically hindered amino alcohol contains at least one secondary amino group which is part of a ring and is attached to either a secondary or tertiary carbon atom or a primary amino group attached to a tertiary carbon atom, wherein the total amine concentration in said liquid absorbent is in the range from about 10 weight % to about 65 weight %, preferably from about 40 weight % to about 55 weight %, and (ii) an organic solvent which is a solvent for said amine and a physical absorbent for said acidic gases, said contacting being conducted at conditions whereby the carbon dioxide and acidic gases are absorbed, preferably at temperatures ranging from about 20° to about 100° C., and more preferably from 40° to about 60° C., and at a pressure ranging from about 1 to about 2000 psig, preferably 100 to about 1000 psig, and (iii) water, in an amount ranging from 1 to 35 weight %, preferably 10 to 20 weight %, and (b) regenerating the liquid absorbent composition by a desorption step at conditions whereby at least a portion of said acidic gases are desorbed from the liquid absorbent, preferably at a temperature in the range from about 50° to about 170° C., and more preferably from 80° to about 150° C. and at a pressure ranging from about 1 to about 50 psia and more preferably from about 15 to 30 psia.

The regenerated liquid absorbent composition may thereafter be recycled to the absorber as is or it may be combined with fresh makeup scrubbing solution.

The time of contacting the gaseous feed with the liquid absorbent may vary from a few seconds to hours, for example, 15 minutes.

After contacting the gaseous feed with the liquid absorbent until the capacity of at least 80% or preferably at least 90% of the solution is utilized it must be regenerated. Regeneration of the liquid absorbent (absorption solution) may be accomplished by decreasing the pressure and/or increasing the temperature of the scrubbing solution to a point at which the absorbed acidic gases, e.g. $CO_2$ are flashed off. The addition of an inert gas, e.g., $N_2$ or steam during the regeneration of the scrubbing solution is also within the scope of the present invention.

It is possible, of course, to employ the process of the present invention in conjunction with other acid gas scrubbing processes. For example, solutions rich in carbon dioxide may be first scrubbed by a bulk scrubbing process using the "hot pot" process, preferably the processes disclosed in U.S. application Ser. No. 590,427, now abandoned and refiled as U.S. Pat. application Ser. No. 862,196, filed Dec. 19, 1977; and U.S. application Ser. No. 750,520, filed Dec. 14, 1976, now U.S. Pat. No. 4,094,957, entitled "Process for Removing Acid Gases with Hindered Amines and Aminoacids", the disclosures of which are incorporated herein by reference. This coarsely prepurified gas may then be treated in accordance with the teachings of the present invention to remove the last residues of the $CO_2$ in the acid gases from the gaseous stream.

The Sterically Hindered Amines

The sterically hindered amines are broadly defined as those compounds containing at least one secondary amino group attached to either a secondary or tertiary carbon atom or a primary amino group attached to a tertiary carbon atom.

As stated earlier, the sterically hindered amines are preferably asymmetrical sterically hindered amino alcohols which include those amino alcohols which contain at least one secondary amino group which is part of a ring and is attached to either a secondary or tertiary carbon atom or a primary amino group attached to a tertiary carbon atom. The most preferred sterically hindered amino alcohols useful in the practice of the present invention include the 2-piperidine alkanols such as 2-piperidine methanol and 2-piperidine ethanol, 2-amino-2-methyl-1-propanol, 2-amino-2-methyl-1-butanol, 3-amino-3-methyl-2-pentanol and 3-amino-3-methyl-1-butanol.

A nonlimiting list of preferred sterically hindered amines useful in the practice of the invention is as follows:

| Sterically Hindered Primary Monoaminoalcohols | |
|---|---|
| H₂N—C(CH₃)(CH₂CH₃)—CH(OH)—CH₃ | 3-amino-3-methyl-2-pentanol |
| cyclobutyl with CH₂OH and NH₂ | 1-hydroxymethyl-cyclopentylamine |
| H₂N—C(CH₃)₂—C(CH₃)—CH₂OH | 2,3-dimethyl-3-amino-1-butanol |
| H₂N—C(CH₃)(CH₂CH₃)—CH₂OH | 2-amino-2-ethyl-1-butanol |
| cyclobutyl with OH, NH₂, CH₃ | 1-methyl-2-hydroxy-cyclopentylamine |
| H₂N—C(CH₃)₂—CH(OH)—CH₂—CH₃ | 2-amino-2-methyl-3-pentanol |
| cyclohexane with CH₃, CH₃, NH₂, OH | 2,4-dimethyl-2-amino cyclohexanol |
| cyclohexyl with NH₂ and CH₂CH₂OH | 1-hydroxyethyl cyclohexylamine |
| cyclohexyl with CH₂OH, NH₂, CH₃ | 1-hydroxymethyl-3-methyl cyclohexylamine |
| cyclohexyl with CH₃, NH₂, CH₂OH | 2-hydroxymethyl-1-methyl cyclohexylamine |
| H₂N—C(CH₃)₂—CH₂OH | 2-amino-2-methyl-1-propanol |
| H₂N—C(CH₃)(CH₂CH₃)—CH₂OH | 2-amino-2-methyl-1-butanol |
| H₂N—C(CH₃)₂—CH₂—CH₂OH | 3-amino-3-methyl-1-butanol |

| Sterically Hindered Primary Monoaminoalcohols | |
|---|---|
| H₂N—C(CH₃)₂—CH(OH)—CH₃ | 3-amino-3-methyl-2-butanol |
| H₂N—C(CH₃)₂—C(CH₃)₂—OH | 2-amino-2,3-dimethyl-3-butanol |
| H₂N—C(CH₃)(CH(CH₃)₂)—CH₂OH | 2-amino-2,3-dimethyl-1-butanol |
| cyclohexyl with CH₂OH and NH₂ | 1-hydroxymethyl-cyclohexylamine |
| piperidine-2-CH₂OH | 2-piperidine methanol |
| piperidine-2-CH₂CH₂OH | 2-piperidine ethanol |
| piperidine-2-CH(OH)CH₃ | 2-(1-hydroxyethyl)-piperidine |
| 2-methyl-5-hydroxy piperidine | 5-hydroxy-2-methyl piperidine |
| 2-methyl-3-hydroxy piperidine | 2-methyl-3-hydroxy piperidine |
| 2,6-dimethyl-3-hydroxy piperidine | 2,6-dimethyl-3-hydroxy piperidine |
| 2,5-dimethyl-4-hydroxy piperidine | 2,5-dimethyl-4-hydroxy-piperidine |

Amino-hydroxyalkyl Ethers

| | |
|---|---|
| H₂N—C(CH₃)₂—CH₂—O—CH₂—CH₂OH | 2-(2-amino-2-methyl-propoxy)-ethanol |

The sterically hindered amines of the present invention will preferably be selected according to other parameters besides steric hindrance. For example, it is important also in choosing an amine for use in the process of the instant invention that it has low volatility so that it will not be lost during absorption and desorption. The amine generally should have a boiling point of at least 100° C., preferably at least 180° C.

In selecting the sterically hindered amine in the process of the present invention, a number of factors should be considered, e.g., the water/solvent ratio, the partial pressure of the $CO_2$ in the gas, the amount of the amine utilized, etc. For example, if the partial pressure of $CO_2$ in the gas is high, it is advisable to use an asymmetrical amine such as 2-piperidine ethanol, since this type of amino alcohol does not lead to precipitation under $CO_2$-rich conditions as easily as the symmetrical amines. Also, an increase of the water/solvent ratio or a reduction of the amount of amine reduces the tendency to precipitation under $CO_2$-rich conditions.

THE SOLVENT

The solvent is selected on the basis of the solubility of the amine and to some extent $CO_2$, therein. The solvents may also be selected on the basis of their boiling point, so that substantial losses during absorption and desorption will not occur. Organic solvents, including hydrocarbons, and functionalized hydrocarbons, e.g., hydrocarbons having oxygen, nitrogen, sulfur, phosphorus, silicon and halogen containing groups may be used, provided said compounds are substantially stable, in combination with said sterically hindered amines, at the conditions at which the absorption and desorption steps are carried out. These compounds, of course, must be liquid at said conditions and preferably will have a boiling point of at least 100° C., more preferably from 150° to 250° C.

The solvents useful in the practice of the present invention are preferably organic compounds which will (1) contain at least one functional group to solubilize the amines; (2) be unreactive with the amines; (3) give a liquid at room temperature when combined with the amine and water; (4) have a solubility for $CO_2$ at 25° C. and one atmosphere of not less than about one volume of $CO_2$ per volume of solvent; and (5) have a boiling point at atmospheric pressures of at least about 150° C. Suitable organic solvents useful in the practice of the present invention include sulfones; sulfoxides; glycols and the mono- and diethers thereof; 1,3-dioxo compounds characterized by being a 5- to 6-membered heterocyclic ring, e.g., dioxolanes and dioxanes; aromatic ethers; aromatic hydrocarbons; pyrrolidones; piperidones; and mixtures thereof.

Other specific examples of nonaqueous solvents, useful in the instant process include sulfolane, N-methylpyrrolidone, dimethyl sulfoxide, polyalkylene glycols, including their mono- or dialkyl ethers, e.g., triethylene glycol, formamide, and hexamethyl phosphoramide.

A more specific description of the organic solvents useful in the practice of the present invention is as follows:

The sulfones useful as solvents in the practice of the present invention are based upon cyclotetramethylene sulfone, the basic and preferred species being sulfolane, otherwise known as tetrahydro thiophene-1,1-dioxide. The sulfones have the general formula:

wherein at least 4 of the R substituents are hydrogen radicals and any remaining Rs being alkyl groups having from 1 to 4 carbon atoms. It is preferred that no more than 2 alkyl substituents are appended to the tetramethylene sulfone ring.

Suitable sulfone derivatives include 2-methyl tetramethylene sulfone; 3-methyl tetramethylene sulfone; 2,3-dimethyl tetramethylene sulfone; 2,4-dimethyl tetramethylene sulfone; 3,4-dimethyl tetramethylene sulfone; 2,5-dimethyl tetramethylene sulfone; 3-ethyl tetramethylene sulfone; 2-methyl-5-propyl tetramethylene sulfone as well as their analogues and homologues.

The sulfoxides useful as solvents in the practice of the present invention include the alkyl-, cycloalkyl- or arylsulfoxides, for example, those sulfoxides of the general formula:

$$R_9-SO-R_{10}$$

wherein $R_9$ and $R_{10}$ are the same or different hydrocarbon monovalent radicals, for example, alkyl radicals having from 1 to 20 and preferably from 1 to 3 carbon atoms, cycloalkyl radicals having, for example, from 3 to 20 carbon atoms or aryl radicals having, for example, from 6 to 20 carbon atoms. The $R_9$ and $R_{10}$ radicals may also be joined together to form an alkylene radical preferably containing 4 to 12 carbon atoms, thus resulting in a ring comprising the sulfur atom.

The following compounds are nonlimitative examples of the sulfoxides which are useful solvents: dimethyl sulfoxide, diethyl sulfoxide, dipropyl sulfoxide, dibutyl sulfoxide, methylethyl sulfoxide, dicyclohexyl sulfoxide, methylcyclohexyl sulfoxide, diphenyl sulfoxide, ethylphenyl sulfoxide, cyclohexylphenyl sulfoxide, ethylphenyl sulfoxide, cyclohexylphenyl sulfoxide and tetramethylene sulfoxide. Dimethyl sulfoxide is the most preferred sulfoxide to be used as a solvent for the liquid absorbents of the invention.

The glycols, polyethylene glycols, polyalkylene glycols and their mono- and diethers useful in the practice of the present invention include the compounds of the following general formula:

$$R_{11}-O+A-O+_mR_{12}$$

wherein A is an alkylene radical which is either linear or branched, having from 2 to 15 carbon atoms and preferably 2-5 carbon atoms; $R_{11}$ and $R_{12}$ are the same or different, e.g., hydrogen atoms, hydrocarbon monovalent radicals having, for example, from 1 to 20 carbon atoms, for example, alkyl, cycloalkyl or aryl radicals; m is an integer of 1 to 20 and preferably 1 to 10.

The following compounds are nonlimiting examples of the glycols, polyethylene glycols, polyalkylene glycols and their mono- and diethers useful as solvents for the liquid absorbents: glycol; diethylene glycol; heptaethylene glycol; decaethylene glycol; 1,3-propylene glycol; hepta(1,3-propylene glycol), tetra-(1,4-butylene glycol), polyethylene glycol of about 400 molecular weight; and tri-(1,3-propylene glycol). The preferred compounds of this class are the polyethylene glycols and their monoalkyl ethers.

The 1,3-dioxoheterocyclic compounds useful in the practice of the present invention can be represented by the following general formulae:

wherein $R_{13}$ and $R_{18}$ represent hydrogen, lower alkyl groups containing 3 to 5 carbon atoms, lower alkyl groups substituted with OH, OR, or phenyl groups, or unsubstituted phenyl groups so selected that the molecular ratio of carbon atoms to oxygen atoms is between 1 and 10. Typical compounds of this class which may be used in accordance with the practice of the present invention include: 2,2-dimethyl-1,3-dioxolane-4-methanol; 2-methyl-2-ethyl-1,3-dioxolane-4-methanol; 2-methyl-2-ethyl-4-methoxymethyl-1,3-dioxolane; 2,2,4-trimethyl-1,3-dioxane; 1,4-dioxaspiro (4,4) nonane; 2-hydroxymethyl-1,4-dioxaspiro (4,4) nonane; and 1,4-dioxaspiro (4,5) decane.

The aromatic hydrocarbons and aromatic ethers useful in the practice of the present invention include those compounds which are liquid at the absorption temperatures, for example, benzene, toluene, orthoxylene, metaxylene, ethylbenzene, paraethyl toluene, diphenyl ether, and their homologues having up to 12 carbon atoms.

The pyrrolidones and piperidones useful in the practice of the present invention include the N-alkyl pyrrolidones and the N-alkyl piperidones having 4 to 12 carbon atoms, for example, 2-pyrrolidone, N-methyl pyrrolidone, N-ethyl pyrrolidone and N-methyl piperidone.

The organic solvent component of the liquid absorbents of the present invention may include a mixture of two or more of the compounds described above.

THE LIQUID ABSORBENT COMPOSITION

The design of the specific composition to be used for the acid gas scrubbing process of the present invention will be based upon the type and amount of $CO_2$ in the acidic gases in the normally gaseous feed to be scrubbed by the liquid absorbent composition of the present invention. In treating normally gaseous feeds having a high concentration of carbon dioxide and hydrogen sulfide, e.g., 35% $CO_2$ and 10-12% $H_2S$, a liquid absorbent having a relatively high amines concentration should be used. Since it is important that the reaction product of the acidic gases and the amines remain soluble, the water content should be increased with correspondingly increased concentration of the amine mixture. Therefore, a typical composition useful or scrubbing a normally gaseous feed having a high concentration of carbon dioxide and hydrogen sulfide will be comprised of about 50-60 weight % of the amine mixture, 1 to 15 weight % of at least one organic solvent, preferably sulfolane, and the balance water.

When the normally gaseous feed to be treated contains a significant amount of organo sulfur compounds, e.g., mercaptans in amounts of about 6% or more, the liquid scrubbing composition of the present invention should be designed to have a high concentration of the solvent so as to solubilize the organo sulfur compounds (the organo sulfur compounds are relatively insoluble in aqueous solutions, but are solubilized by organic solvents such as sulfolane). A typical liquid scrubbing solution for use in removing large amounts of organo sulfur compounds from normally gaseous mixtures should include about 15 weight % of the amine, about 75 weight % of at least one organic solvent, preferably sulfolane, and the balance, about 10 weight % water.

In those instances where carbon dioxide is the major part of the acidic gases and hydrogen sulfide and COS exist as minor components of the acidic gases in the normally gaseous feed to be treated, it is desirable to use a liquid scrubbing composition having nearly an equivalent weight % of the amine mixture and organic solvent and sufficient water to generate steam and reduce the viscosity of the solvent. A typical liquid scrubbing solution for use in scrubbing these high $CO_2$ content gases will contain about 45 weight % of the amine mixture, about 40 weight % of the solvent, preferably sulfolane, and the balance, about 15 weight % water.

As can be seen from the above considerations, the amount of the amine mixture, solvent and optionally water to be used to prepare the liquid absorbent scrubbing composition of the present invention may vary widely, depending on the intended use and the type of gas to be treated. Generally speaking, one typical liquid absorbent composition of the present invention will contain from 10 to about 45 weight % of the amine mixture, 1 to about 35 weight % water and the balance being at least one organic solvent. Another typical liquid absorbent composition will be comprised of 45 to about 65 weight % of the amine, 15 to about 35 weight % water and essentially all of the balance being at least one organic solvent for the amine.

The normally gaseous feeds to be treated in accordance with the process of the present invention may include sour natural gas, hydrogen synthesis gas, refinery gas or any other normally gaseous feeds containing acidic gases.

The amine mixture may be used with the solvent and optionally water in any convenient manner. In one preferred embodiment of the invention there is provided a sterically hindered amino alcohol which is premixed with the solvent (and optionally water) and placed in the form of a concentrate. This concentrate may optionally include commonly used additives, such as antifoaming agents, antioxidants, corrosion inhibitors, etc. Examples of such additives include arsenious anhydride, selenious and tellurous acid, protides, amino acids, e.g. glycine, vanadium oxides, e.g., $V_2O_3$, chromates, e.g., $K_2Cr_2O_7$, iodine and iodine compounds, etc.

It should be noted that, as used throughout the instant specification, a scrubbing solution which does not comprise the sterically hindered amines defined above, may comprise a non-sterically hindered amine, e.g., mono- and diethanolamine, and diisopropanolamine, etc.

By practicing the process of the present invention one can operate the process at conditions whereby the thermodynamic capacity (also referred to as "working capacity" or "cyclic capacity") (as determined from the vapor-liquid equilibrium isotherm in the reaction mixture) would be greater, preferably at least 15% greater, and more preferably 20 to 60% greater than in a solvent-amine scrubbing process wherein diisopropanolamine is the only amine utilized under similar conditions of gaseous feed composition, scrubbing solution composition, temperatures and pressures. The thermodynamic cyclic capacity or working capacity for a given $CO_2$ scrubbing process is the difference in the moles of $CO_2$ absorbed in the solution at the termination of the absorption step and desorption step per moles of amine in the solution. In other words, working capacity is defined as follows:

which is:

It should be noted that throughout the specification wherein working capacity is referred to, the term may be defined as the difference between $CO_2$ loading in solution at absorption conditions (step 1) and the $CO_2$ loading in solution at regeneration conditions (step 2). The term "working capacity" is to be construed as synonymous and relates to the thermodynamic cyclic capacity, that is the loading is measured at equilibrium conditions. This working capacity may be obtained from the vapor-liquid equilibrium isotherm that is from the relation between the $CO_2$ pressure in the gas and the $CO_2$ loading in the solution at equilibrium at a given temperature. To calculate the thermodynamic cyclic capacity, the following parameters must usually be specified: (1) $CO_2$ absorption pressure, (2) $CO_2$ regeneration pressure, (3) temperature of absorption, (4) temperature of regeneration, (5) solution composition, that is weight percent amine and the weight percent of the organic solvent, for example, sulfolane, and (6) gas composition. The use of these parameters to describe the improved process of the instant invention is documented in the examples below, and in FIG. 2. However, the skilled artisan may conveniently demonstrate the improved process which results by use of a sterically hindered amine by a comparison directly with a process wherein the sterically hindered amine is not included in the aqueous scrubbing solution. For example, it will be found when comparing two similar $CO_2$ scrubbing processes (that is similar gas composition, similar scrubbing solution composition, similar pressure and temperature conditions) that when the sterically hindered amines of the instant invention are utilized the difference between the amount of $CO_2$ absorbed at the end of step 1 (absorption step) defined above and step 2 (desorption step) defined above is significantly greater. This significantly increased working capacity is observed when the scrubbing solution that is being compared comprises an equimolar amount of a prior art amine, such as diisopropanolamine and the solvent is sulfolane. It has been found that the use of the sterically hindered amines of the instant invention gives a thermodynamic cyclic capacity, (working capacity) which is substantially greater, e.g. at least 15% greater than that of a scrubbing solution which does not utilize a sterically hindered amine, diisopropanolamine, sulfolane and water. Working capacity increases of from 20 to 60% may be obtained by use of the sterically hindered amines of the instant invention.

While not wishing to be bound by theory, it is believed that the use of sterically hindered amines gives the above-described improvements for the following reasons.

When $CO_2$ is absorbed into an aqueous primary amine solution, the following reactions occur:

(1) $R-NH_2 + CO_2 \rightarrow R-NH-COO^- + H^+$ (2) $R-NH-COO^- + H_2O \rightarrow R-NH_2 + HCO_3^-$

(3) $H^+ + R-NH_2 \rightarrow R-NH_3^+$

The amount of $CO_2$ that can be absorbed depends on the extent of reaction (2). If reaction (2) is negligible, the net result of reactions (1) and (3) will be:

i.e., the maximum amount of $CO_2$ that can be absorbed is 0.5 mols/mol of amine.

On the other hand, if reaction (2) is quantitative the net result of reactions (1), (2), and (3) will be i.e. the maximum amount of $CO_2$ that can be absorbed is 1 mol/mol of amine.

The extent of reaction (2) depends on the nature of R, particularly on its steric configuration. If R is a primary alkyl group, the carbamate will be relatively stable and its decomposition, i.e. reaction (2), will be incomplete. The maximum amount of $CO_2$ that can be absorbed will be only slightly higher than 0.5 mols/mol of amine. On the other hand, if R is a tertiary alkyl group, the carbamate will be very unstable and its decomposition, i.e. reaction (2) will be practically complete. The maximum amount of $CO_2$ that can be absorbed will be close to 1 mol/mol of amine. Thus, when the amine is sterically hindered, $CO_2$ absorption is more complete than when it is unhindered.

When desorption is carried out, reactions (1), (2) and (3) go from right to left. If R is a primary alkyl group, the decomposition of the carbamate will be incomplete, i.e. desorption will be only partial. On the other hand, if R is a tertiary alkyl group there will be no way for $CO_2$ to be in a stable form and desorption will be practically complete. Therefore, the amount of $CO_2$ absorbed or desorbed per mole of amine is higher when the amine is sterically hindered.

Besides increasing working capacity and rates of absorption and desorption, the use of sterically hindered amino groups leads to lower steam consumption during desorption due to the lower amount and easier decomposition of the carbamate.

Steam requirements are the major part of the energy cost of operating an acid gas, e.g., $CO_2$ scrubbing unit. Substantial reduction in energy, i.e., operating costs will be obtained by the use of the process of the sterically hindered amines. Additional savings from new plant investment reduction and debottlenecking of existing plants may also be obtained by the use of sterically hindered amines. The removal of acid gases such as $CO_2$ from gas mixtures is of major industrial importance. The larger-scale applications fall into two categories:

(a) The hydrogen industry, where hydrogen mixed with $CO_2$ is manufactured from gas, coal or petroleum fractions; large amounts of hydrogen are used in the ammonia industry and the amount of $CO_2$ to be removed is of the order of 1.2 to 2.2 tons per ton of $NH_3$.

(b) The gas industry:
  (1) Treatment of natural gases containing large concentrations of $CO_2$.
  (2) Upgrading of town gases manufactured from gasification of coal or reforming of petroleum fractions. A medium size coal gasification plant, producing 250 MM SCF/D of substrate natural gas, requires removal of 7–8,000 tons/day of $CO_2$.

The invention is illustrated further by the following examples which, however, are not to be taken as limiting in any respect. All parts and percentages, unless expressly stated otherwise, are by weight.

EXAMPLE 1

Figure 1:
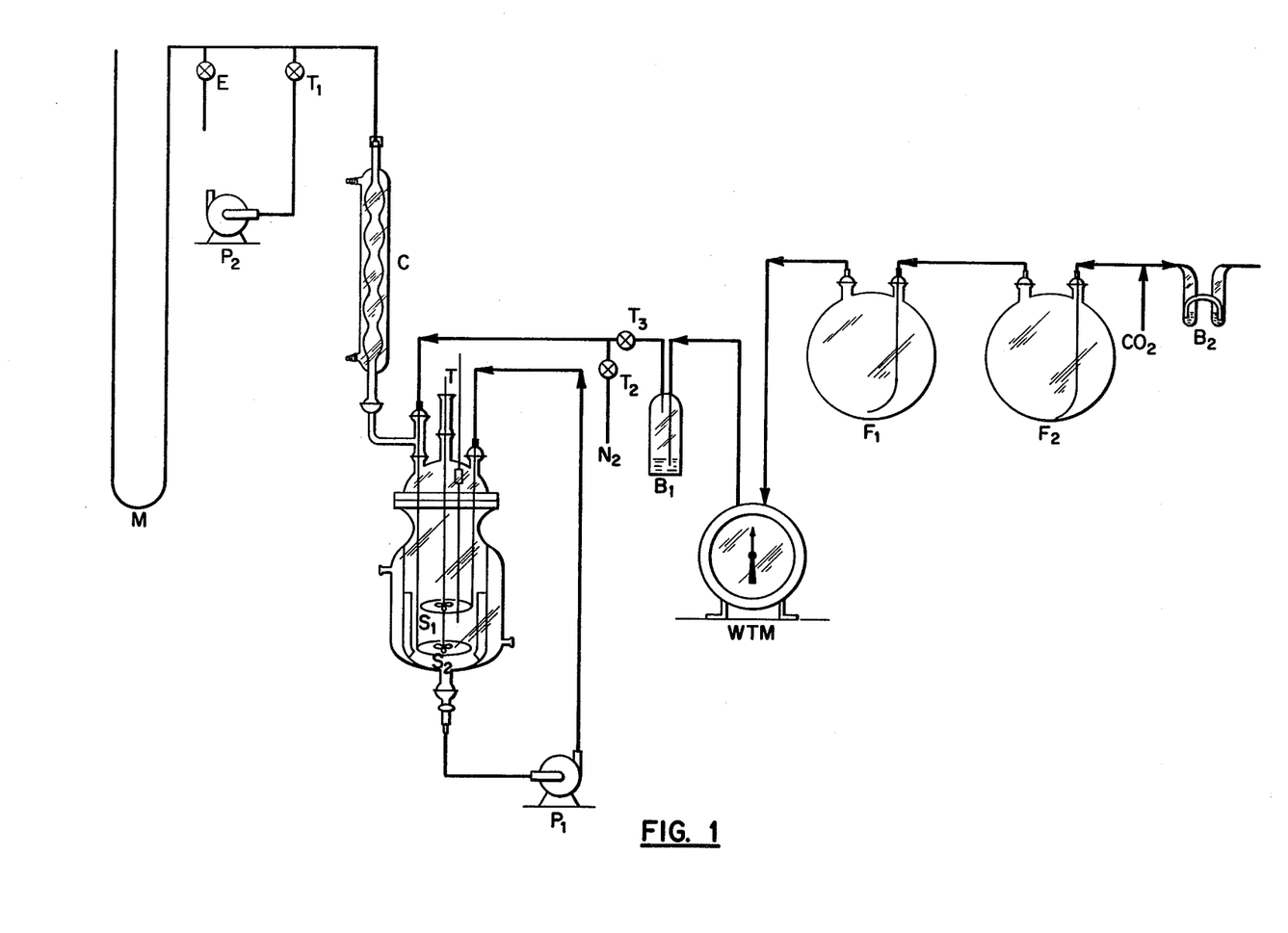
FIG. 1 is a diagrammatic flow sheet illustrating an experimental reaction apparatus for removing carbon dioxide from gas streams.

The experimental reaction apparatus is shown in FIG. 1. It is a vessel having a capacity of about 2.5 liters and a diameter of 10 cm, equipped with a heating jacket. The stirrer shaft carries two 3-blade propellers, of which the upper one pushes the liquid downward and the lower one pushes the liquid upward. Pump $P_1$ removes liquid from the bottom of the reactor and feeds it back to the gas-liquid interface through a stainless-steel sparger $S_1$. Vertical baffles further increase the contact between liquid and gas. Thermocouple T permits the reading of the temperature of the liquid. The top of the reflux condenser C is connected to a U-shaped, open-ended manometer M. The apparatus can be evacuated by means of pump $P_2$ through tap $T_1$. Nitrogen and $CO_2$ can be fed to the bottom of the cell through sparger $S_2$, using respectively taps $T_2$ or $T_3$. $CO_2$, coming from a cylinder, goes first through the two 12-1 flasks $F_1$ and $F_2$, acting as ballasts, then through a 3-1 wet test-meter WTM, then through bubbler $B_1$, where it is saturated with water. Hg-bubbler $B_2$ insures that no air is sucked into flask $F_2$.

Constrictions such as narrow tubings and taps have been carefully avoided in the $CO_2$ path. Tap $T_3$, which is the only one inserted in such a path, has a key with large holes (8mm).

DETAILED DESCRIPTION OF ABSORPTION-DESORPTION-REABSORPTION EXPERIMENTS

A. ABSORPTION

The following reagents are charged into the apparatus (as shown in FIG. 1) while bubbling nitrogen through tap $T_2$ and keeping exhaust E open and tap $T_3$ closed.

Amine = 1 mole
Sulfolane = 540 grams
Water = 218 grams

The temperature of the liquid is brought to 40° C, pump $P_1$ is regulated so as to suck and feed about 4 liters per minute, the stirrer is kept turning at 1200 rpm. Exhaust E and tap $T_2$ are closed and the apparatus is evacuated by means of pump $P_2$ until the liquid begins to boil, which occurs when the residual pressure is about 50mm Hg. Tap $T_1$ is closed. At this point tap $T_3$ is opened and absorption starts. Simultaneously a timer is started. Every time the wet-test-meter (WTM) indicates that a liter has been absorbed, the time is taken. At the beginning the absorption is very rapid. If the amine used is the sterically-hindered 2-amino-2-methyl-1-propanol, 18.6 liters of $CO_2$ is absorbed. Subtracting 2 liters used to fill the gaseous space, the corrected amount of $CO_2$ absorbed is 16.6 liters. The $CO_2$ content is 3.3%.

If the non-sterically hindered diisopropanolamine is used, 13.1 liters of $CO_2$ is absorbed. Subtracting the amount used to fill the gaseous space in the reactor, the corrected amount of $CO_2$ absorbed is 11.1 liters. The $CO_2$ content is 2.1%.

B. DESORPTION

Exhaust E is open, taps $T_2$ and $T_3$ are closed. The reaction mixture is brought to 105° C, while stirring slowly and keeping the liquid circulation rate at a minimum. When the temperature reaches 105° C, nitrogen is blown from tap $T_2$ through sparger $S_2$ at a rate of 1 mole/hour. A sample of liquid is taken after 60 minutes. The $CO_2$ content at the end of the desorption is about 0.2% with either amine, i.e., desorption is practically complete in either case.

C. REABSORPTION

The reaction mixture is brought back to 40° C, while still blowing nitrogen, the stirrer and pump $P_1$ are regulated in the same way as for the absorption. Exhaust E and tap $T_2$ are closed and the apparatus is evacuated by means of pump $P_2$, until the liquid begins to boil, which occurs when the residual pressure is about 50mm Hg. Tap $T_1$ is closed. Tap $T_3$ is opened and reabsorption starts. Simultaneously, the time is started. Times are taken as during absorption.

In Table I, the results of the experiments described above with respect to the $CO_2$ desorption-reabsorption cycle using 2-amino-2-methyl-1-propanol are given along with the results of similar experiments using the sterically unhindered amine, diisopropanolamine. As shown in Table I, the sterically unhindered amine, diisopropanolamine, desorbs and reabsorbs lower amounts of $CO_2$ than the sterically hindered amine. The advantage given by the latter is about 50%.

TABLE I

| COMPARISON OF $CO_2$ DESORPTION-REABSORPTION EXPERIMENTS IN SULFOLANE-AMINE SOLUTIONS | | |
|---|---|---|
| Amine | g. $CO_2$ desorbed | g. $CO_2$ reabsorbed |
| Diisopropanolamine | 17.3 | 19.2 |
| 2-amino-2-methyl-1-propanol | 27.2 | 28.2 |

As can be seen from the data in Table I the sterically hindered amines of the instant invention allow a more complete desorption as compared to the prior art amine run under the same desorption conditions. Thus, savings in the steam utilized to heat and purge the absorption solution during the regeneration step are obtained.

The absorption experiment described above is repeated using different amine-solvent absorbent solutions. The results are shown in Table II, Table III, Table IV, Table V, Table VI and Table VII. It will be noted that in each case the sterically hindered amines of the instant invention absorbed more $CO_2$ than the sterically unhindered amine, diisopropanolamine.

TABLE II
$CO_2$ ABSORPTION EXPERIMENTS INTO LEAN $CO_2$ SOLUTION[a]

| Amine | g. $CO_2$ absorbed |
|---|---|
| Diisopropanolamine | 31.1 |
| 3-amino-3-methyl-1-butanol | 51.0 |
| 2-piperidine methanol | 48.0 |

[a]Conditions: Amine = 1.83 mols; Sulfolane = 400g; $H_2O$ = 194g; Temp. = 40° C; Pressure = 1 atm.

TABLE III
$CO_2$ ABSORPTION EXPERIMENTS INTO LEAN $CO_2$ SOLUTION[a]

| Amine | g. $CO_2$ absorbed |
|---|---|
| Diisopropanolamine | 14.6 |
| 2-piperidine methanol | 22.6 |

[a]Conditions: Amine = 0.9 mols; Sulfolane = 600g; $H_2O$ = 80g; Temp. = 40° C; Pressure = 1 atm.

TABLE IV
$CO_2$ ABSORPTION EXPERIMENTS INTO LEAN $CO_2$ SOLUTION[a]

| Amine | g. $CO_2$ absorbed |
|---|---|
| Diisopropanolamine | 30.6 |
| 2-piperidine methanol | 45.0 |

[a]Conditions: Amine = 1.83 mols; Dimethylsulfoxide = 400g; $H_2O$ = 194g; Temp. = 40° C; Pressure = 1 atm.

TABLE V
$CO_2$ ABSORPTION EXPERIMENTS INTO LEAN $CO_2$ SOLUTIONS[a]

| Amine | g. $CO_2$ absorbed |
|---|---|
| Diisopropanolamine | 29.7 |
| 2-piperidine ethanol | 45.5 |

[a]Conditions: Amine = 1.8 mols; N-methylpyrrolidone = 400 g; $H_2O$ = 194g; Temp. = 40° C; Pressure = 1 atm.

TABLE VI
$CO_2$ ABSORPTION INTO LEAN $CO_2$ SOLUTIONS[a]

| Amine | g. $CO_2$ absorbed |
|---|---|
| Diisopropanolamine | 26 |
| 2-piperidine ethanol | 35.5 |

[a]Conditions: Amine = 2.16 mols, Diethylene glycol = 300g; $H_2O$ = 12g; Temp. = 40° C; Pressure = 1 atm.

TABLE VII
$CO_2$ ABSORPTION EXPERIMENTS INTO LEAN $CO_2$ SOLUTION[a]

| Amine | g. $CO_2$ absorbed |
|---|---|
| Diisopropanolamine | 36 |
| 2-piperidine ethanol | 54 |

[a]Conditions: Amine = 2.5 mols; Sulfolane = 300g; $H_2O$ = 112.5g; Temp. = 40° C; Pressure = 1 atm.

It will be noted that in the above experiments wherein the nonaqueous solvent is used, water is present. In this connection it is preferred that from 0.5 moles $H_2O$ per mole of amine to 10 moles $H_2O$ per mole amine be present in the "nonaqueous scrubbing solution".

EXAMPLE 2

The following experiment was carried out using the apparatus shown in FIG. 1 and described in Example 1. The absorber is charged with 324g of 2-piperidine ethanol, 300g of tetrahydrothiophene-1,1-dioxide (sulfolane) and 112.5g of water. The solution is brought to 40° C, then the reactor is evacuated and $CO_2$ is admitted into it. 36 liters of $CO_2$ are absorbed. The rich solution so obtained is transferred to the desorber where it is heated at 105° C. for 15 minutes. The regenerated solution so obtained is transferred back to the absorber and subjected again to absorption. 31.9 liters of $CO_2$ are absorbed.

A wet-test meter inserted between the $CO_2$ cylinder and the absorber permits to establish the amounts of gas absorbed as a function of time. The result is given in Table VIII.

TABLE VIII

| Liters of $CO_2$ Absorbed | Time Min. | Time Sec. |
|---|---|---|
| 5 | 0 | 13 |
| 10 | 0 | 31 |
| 15 | 0 | 53 |
| 20 | 1 | 24 |
| 25 | 2 | 21 |
| 30 | 5 | 02 |

EXAMPLE 3

The following experiment is carried out using the apparatus shown in FIG. 1 and described in Example 1.

A. ABSORPTION 118g (0.90 mols) of 2-piperidine ethanol, 600g of sulfolane and 80g of water is charged into the absorber, while slowly blowing nitrogen through tap $T_2$ and $T_3$ and keeping exhaust E open. The temperature is brought to 40° C, the stirrer is regulated to 1200 rpm. Exhaust E and tap $T_2$ are closed and the apparatus is evacuated by means of pump $P_2$ until the liquid begins to boil. Tap $T_1$ is then closed. Pump $P_1$ is activated and regulated so as to suck and feed about 4 liters of liquid per minute. Tap $T_3$ is opened and absorption begins. The total amount of $CO_2$ absorbed is 16.1 liters. Subtracting the amount used to fill the gaseous space, the amount of $CO_2$ absorbed is 14.1 liters, corresponding to 25.4g. Analysis of the liquid gives a $CO_2$ content of 3%.

B. DESORPTION

The liquid is transferred to the desorber by means of pump $P_1$. The heating mantle of the desorber is regulated so as to cause the temperature of the liquid to climb to 105° C (221° F). Nitrogen is blown through the sparger at a rate of 1 mol/hour. After 15 minutes, the liquid is transferred back to the absorber. The $CO_2$ content has dropped to 0.3%, i.e., the desorption is practically complete.

C. REABSORPTION

The temperature of the liquid is brought to 40° C, while slowly blowing nitrogen and stirring at 1200 rpm. Exhaust E and tap $T_3$ are closed and the apparatus is evacuated by means of pump $P_2$, until the liquid begins to boil. Tap $T_3$ is opened and reabsorption is started. Every time a liter of $CO_2$ is absorbed, an impulse goes to a recorder. In total, 14.6 liters of $CO_2$ is reabsorbed in 5 minutes. Subtracting the amount of $CO_2$ used to fill the gaseous space, the amount of $CO_2$ reabsorbed is 12.6 liters, corresponding to 22.8g.

EXAMPLE 4

Some vapor liquid equilibrium experiments are carried out to confirm that sterically hindered amines lead to a broadening of the thermodynamic cyclic capacity owing to a shift in the equilibrium position.

The reaction apparatus is a 1-liter autoclave equipped with inlet and outlet tubes for gases. (The entering gases are saturated with water and the outgoing gases pass through a condenser so as to keep constant the amount of water present in the autoclave and liquid sampling device). The autoclave is charged with a mixture of amine, sulfolane and water (in amounts as indicated in the tables below). The autoclave is brought to 40° C to simulate absorption conditions and a gas mixture containing 50% $CO_2$ and 50% He is slowly blown through the liquid at a pressure of 300 psi. This is continued until the outgoing gas has the same composition as the entering gas, i.e., 50% $CO_2$. At this point the equilibrium between the liquid and the gas has been reached. A liquid sample is taken and analyzed for total $CO_2$.

The experiment is repeated, this time using a $CO_2$-He mixture containing 0.2% $CO_2$ and operating at 50 psi and at a temperature of 250° F (121.1° C). After equilibrium has been reached the liquid is analyzed. The results of these experiments using sterically unhindered diisopropanolamine compared with the sterically hindered 2-piperidine alkanols are shown in Table IX. The high temperature, low $CO_2$, low pressure conditions simulate desorption, whereas the low temperature, high $CO_2$, high pressure conditions simulate absorption. The thermodynamic cyclic capacity (working capacity) of the sterically hindered amines is about 31% and 69% greater than that shown for diisopropanolamine.

TABLE IX

EQUILIBRIUM EXPERIMENTS IN ORGANIC SOLVENT-AMINE SOLUTIONS[a]

| Amine | $CO_2$/Amine Molar Ratios | |
|---|---|---|
| | 0.2% $CO_2$ in gas 250° F (121.1° C) 50 psi | 50% $CO_2$ in gas 100° F (37.7° C) 300 psi |
| Diisopropanolamine | 0 | 0.58 |
| 2-piperidine methanol | 0 | 0.76 |
| 2-piperidine ethanol | 0 | 0.98 |

[a]Conditions: Amine = 1.67 mols; Sulfolane = 200g; $H_2O$ = 75g.

Figure 2:
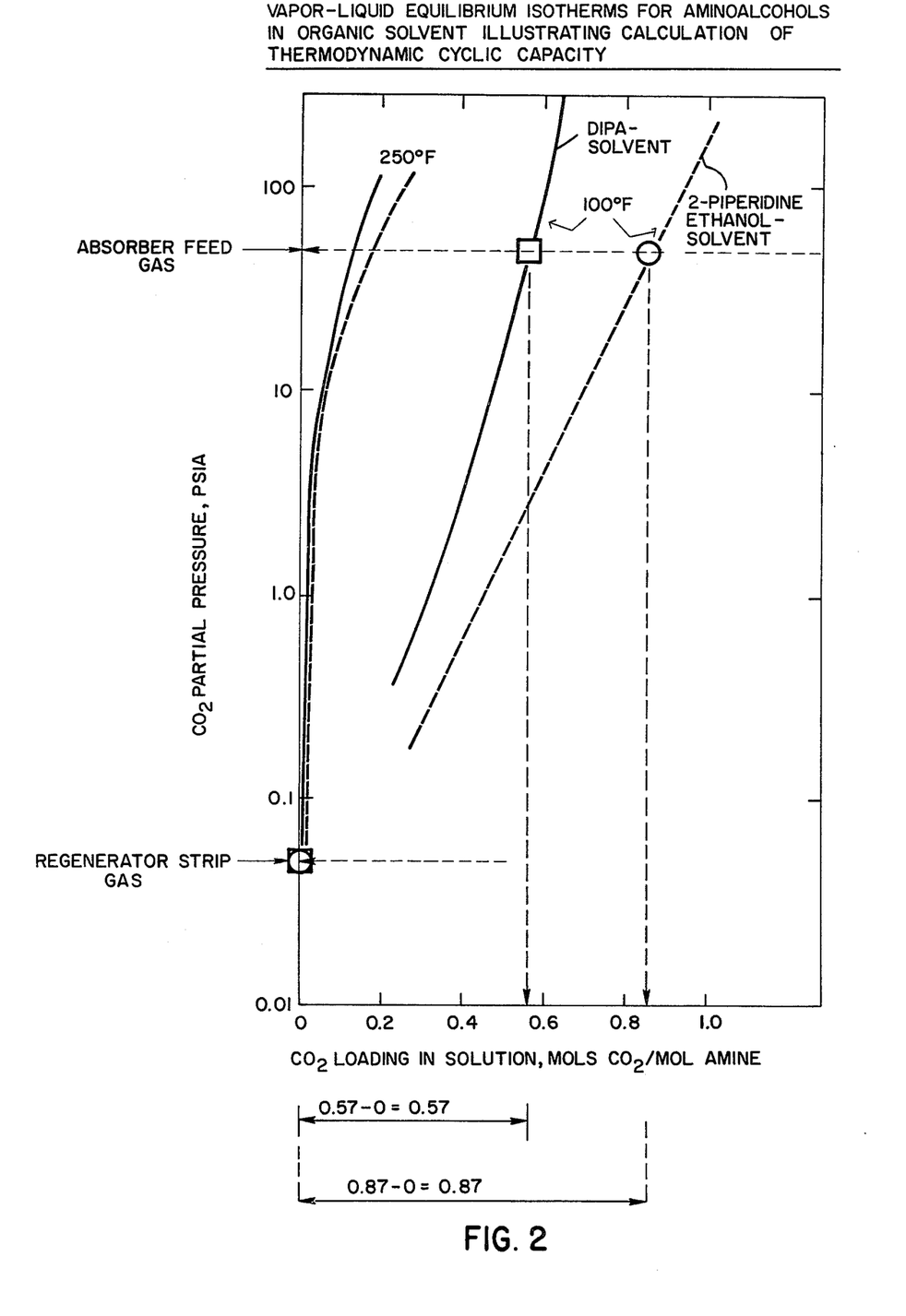
FIG. 2 graphically illustrates the vapor liquid equilibrium isotherms for diisopropanolamine-sulfolane (prior art scrubbing solution) and 2-piperidine ethanolsulfolane (sterically hindered amine system of the instant invention) at 100° F. (37.7° C.), 175° F. (79.4° C.) and 250° F. (121.1° C.) wherein the $CO_2$ partial pressure is a function of the mols of $CO_2$ absorbed by the solution per mol of amine.

In FIG. 2, the equilibrium $CO_2$ partial pressure over the scrubbing solution as a function of the $CO_2$ absorbed by the solution in moles of $CO_2$ per moles of amine is shown for diisopropanolamine and 2-piperidine ethanol with sulfolane and water at 250° F (121.1° C) and 100° F (37.7° C). In the case of the diisopropanolamine experiments, the scrubbing solution contained 45 weight % amine, 40 weight % solfolane and 15 weight % water. In the case of the 2-piperidine ethanol experiments, diisopropanolamine had been replaced by an equimolar amount of 2-piperidine ethanol.

It is clear from FIG. 2 that at lower $P_{CO_2}$ values, the $CO_2$ absorption of the respective solutions (those containing the sterically hindered amine and those containing the sterically unhindered amine) are very close to one another. On the other hand, however, at the high $P_{CO_2}$ values the $CO_2$ absorbed values are considerably higher for the sterically hindered amine containing solutions at the temperature conditions tested.

GENERAL

Scrubbing solution capacity for acid gas is a dominant factor in scrubbing economics. Solution capacity determines the amount of solution which must be circulated. Thus, it affects the size of towers, pumps and heat exchangers as well as the utilities for solution heating and cooling.

The use of the sterically hindered amine compounds of the present invention as a part of the liquid absorbent leads to higher solution capacity for $CO_2$ than can be obtained with conventionally used sterically non-hindered amines e.g., diisopropanol amine. Typical working capacity (cyclic capacity) results from low pressure, batch experiements are shown in Table X.

TABLE X

MEASURED CYCLIC $CO_2$ CAPACITIES IN AMINOALCOHOL SOLUTIONS FOR LOW-PRESSURE ABSORPTION AT 104° F[a]

| | Sterically Hindered Amine (2-piperidine ethanol) | Sterically Non-hindered Amine (Diisopropanolamine) |
|---|---|---|
| Working Capacity (mols $CO_2$/L) | 2.04 | 1.37 |
| Capacity Advantage for Sterically Hindered Amine, % | 49 | — |

[a]Conditions: Sulfolane = 300g; $H_2O$ = 112.5 g; amine = 2.5mols; T of absorption = 40° C; T of desorption = 105° C; desorption time = 15 minutes.

The higher working capacity found for the sterically hindered amine containing absorbent liquid is due to a different equilibrium behavior. This can be seen by comparing the vapor-liquid equilibrium isotherms shown in FIG. 2. The sterically hindered amine containing liquid shows a much greater dependence of $CO_2$ absorbed on pressure than is the case with the conventional amine, diisopropanolamine. This accounts for the higher capacity observed with sterically hindered amine containing absorbents in typical delta-pressure scrubbing cycles. The isotherms for sterically hindered 2-piperidine ethanol asymptote to $CO_2$ absorption of 1.0 mol $CO_2$/mol amine, whereas those for the absorbents containing the sterically unhindered amines such as diisopropanolamine extend only slightly above 0.5 mols $CO_2$ absorbed/mol amine.

The equilibrium capacity advantage for the sterically hindered amine containing absorbents of the present invention will be a function of the pressure-temperature scrubbing cycle under consideration. The sterically hindered amino alcohol, 2-piperidine ethanol shows its maximum advantage for absorption at low temperatures and high $CO_2$ partial pressures in the feed gas. Under these conditions the advantage can exceed 30%. It has been found that desorption at 250° F is virtually complete in amine-solvent absorbents for both sterically hindered aminoalcohols and the sterically unhindered aminoalcohols such as diisopropanol amine.

Heat effects associated with $CO_2$ absorption and desorption are an important fact in $CO_2$ scrubbing processes. Some of the heat released on absorption is absorbed by the scrubbing solution. If solution heatup is excessive, equilibrium capacity may be reducted. Heat of desorption is one component of the regeneration energy requirements.

Isosteric heats of reaction, $\Delta H$, have been calculated for 2-piperidine ethanol and diisopropanolamine solutions in Sulfolane-$H_2O$. Isosteric $\Delta H$ was found to decrease with increasing mols $CO_2$/mol amine in solution. A possible explanation is that, at low loadings, the ions formed by the reaction of $CO_2$ with the amine are more easily solvated, thereby giving a larger constribution to the total heat of reaction. Interestingly, $\Delta H$ seems to be independent of amine type, depending only on the $CO_2$ loading.

For a 2-piperidine ethanol-Sulfolane-water solution cycle, in which $CO_2$ loading in solution varies between 0 and 0.6 mols $CO_2$/mol of 2-piperidine ethanol, the average $\Delta H$ is about 32,500 Btu/lb. mol $CO_2$. For a corresponding cycle with diisopropanolamine-Sulfolane-water solution, with its smaller loading range of 0 to about 0.4 mols CO₂/mol diisopropanolamine, the average ΔH would be about 35,000 Btu/lb. mol CO₂ absorbed. The actual loading range therefore appears to depend on the CO₂ pressure in the feed gas. Experiments have shown that ΔH falls as the amine concentration in the solvent is reduced, for both the sterically hindered amino alcohols and the sterically unhindered aminoalcohols. It appears that the solvent acts to reduce the average heat of reaction. Also, calorimeter experiments and data have confirmed that 2-piperidine ethanol gives a slightly lower average thermal effect than diisopropanolamine.

Economic considerations usually dictate that CO₂ scrubbing systems be designed so that equilibrium is approached closely in the absorber and regenerator towers. Rates of absorption and regeneration are important in that they determine the column height (packing volume) needed to bring gas and liquid phases close to equilibrium.

Data from batch absorptions at low pressures indicate (even though this may not actually simulate the true kinetics of acid gas absorption and desorption in countercurrent packed towers) that absorption and desorption rates with sterically hindered amine-solvent absorbents are faster than rates with comparable systems which include diisopropanolamine as the amine. Typical absorption rate data are given in Table XI.

TABLE XI

| | CO₂ Absorption Rates Into Aminoalcohol-Sulfolane-H₂O Absorbents (100° F) | | | |
|---|---|---|---|---|
| | Absorption Rate, Mols CO₂/Hr | | | |
| | CO₂/Amine in the Solution | | | |
| Amino alcohol | 0.04 | 0.20 | 0.40 | 0.60 |
| 2-piperidine ethanol | 74 | 37 | 13 | 1.4 |
| diisopropanolamine | 49 | 14 | 7 | — |

A possible explanation of why the piperidine ethanol containing absorbent gives higher rates of CO₂ absorption than the corresponding diisopropanolamine containing absorbent is as follows. For every mole of CO₂ absorbed, a mole of ammonium ion is formed. However, in the case of 2-piperidine ethanol all the remaining amine is in free form, i.e., able to react with CO₂. On the other hand, a certain portion of the total diisopropanolamine will be in the form of carbamate, i.e., unable to react with CO₂. As a consequence, for the same ratio of CO₂ absorbed to initial amine, the percentage of free amine will be higher in the case of 2-piperidine ethanol, which apparently explains the higher absorption rates in the batch-type experiments.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. In a process for the removal of CO₂ from a normally gaseous feed containing CO₂ which comprises.
   (1) contacting said normally gaseous feed with an amine-solvent liquid absorbent comprising:
      (a) an amine, and
      (b) a solvent which solubilizes said amine and is a physical absorbent for said CO₂, and
   (2) regenerating said absorbent at conditions whereby CO₂ is desorbed from said absorbent, the improvement which comprises providing at least one sterically-hindered amine in said scrubbing solution as said amine and operating said process at conditions whereby the difference between the moles of CO₂ absorbed at the end of step (1) (absorption step) and the moles of CO₂ absorbed at the end of step (2) (desorption step) would be greater at the thermodynamic equilibrium of the vapor-liquid system (as determined from the vapor-liquid equilibrium isotherm of the reaction mixture) than in a CO₂ gas scrubbing process utilizing a nonaqueous organic solvent and an amine wherein diisopropanolamine is the only amine utilized under similar conditions of gaseous feed composition, scrubbing solution composition, temperatures and pressures.

2. The process of claim 1 wherein said liquid absorbent includes up to about 35 weight % water.

3. The process of claim 1 wherein said sterically hindered amine is a compound containing at least one secondary amino group attached to either a secondary or tertiary carbon atom or a primary amino group attached to a tertiary carbon atom.

4. The process of claim 1 wherein said sterically hindered amine is a compound which contains at least one secondary amino group which is part of a ring and is attached to either a secondary or tertiary carbon atom or a primary amino group attached to a tertiary carbon atom.

5. The process of claim 1 wherein the sterically hindered amine is selected from the group consisting of 2-piperidine methanol, 2-piperidine ethanol, 2-amino-2-methyl-1-propanol, 2-amino-2-methyl-1-butanol, 3-amino-3 methyl-2-pentanol and 3-amino-3-methyl-1-butanol.

6. The process of claim 1 wherein the sterically hindered amine is selected from the group consisting of 2-piperidine methanol and 2-piperidine ethanol.

7. The process of claim 1 wherein the solvent is a non-aqueous liquid organic selected from the group consisting of sulfolane, N-methyl-pyrrolidone, dimethyl sulfoxide, polyalkylene glycols and their mono- and dialkyl ethers, formamide and hexamethyl phosphoramide.

8. The process of claim 1 wherein the solvent is a cyclotetramethylene sulfone.

9. The process of claim 1 wherein the solvent is sulfolane.

10. The process of claim 1 wherein the liquid absorbent includes from 1 to about 35 weight percent of water.

11. The process of claim 1 wherein said CO₂ gas is absorbed by said liquid absorbent at a temperature ranging from about 20° to about 100° C. and at a pressure ranging from about 1 to 2000 psig and said acidic gases are desorbed from said liquid absorbent at a temperature ranging from about 50° to about 170° C. and at a pressure ranging from about 1 to about 50 psia.

12. The process of claim 11 wherein the absorption is conducted at a temperature ranging from about 40° to 60° C. and at a pressure ranging from about 15 to about 30 psia.

13. A process for the substantial removal of carbon dioxide in acidic gases from a normally gaseous feed containing CO₂, which comprises:

(1) contacting said normally gaseous feed with an amine-solvent liquid absorbent to absorb said carbon dioxide, wherein said amine-solvent liquid absorbent comprises:
  (a) a sterically hindered amine comprising 2-piperidine methanol or 2-piperidine ethanol,
  (b) sulfolane, and
  (c) up to about 35 weight percent of water; wherein said absorption is conducted at a temperature ranging from about 100 to about 1000 psig, and
(2) desorbing the absorbed carbon dioxide from said solution at a temperature ranging from about 80° to about 150° C. and at a pressure ranging from about 15 to about 30 psia.

14. The process of claim 13 wherein the water content of said amine-solvent absorbent is in the range from about 10 to about 20 weight percent.

15. In a process for removing $CO_2$ from gaseous feeds which comprises, in sequential steps:
(1) contacting said feed with an amine-solvent liquid absorbent at conditions whereby said $CO_2$ is absorbed into said scrubbing solution, said amine-solvent liquid absorbent being comprised of:
  (a) a nonaqueous organic solvent selected from the group consisting of hydrocarbons and functionalized hydrocarbons wherein the functional groups of said functional hydrocarbon is selected from the group consisting of oxygen, nitrogen, sulfur, phosphorus, silicon or halogen-containing groups,
  (b) an amine, and
  (c) water,
(2) regenerating said scrubbing solution at conditions whereby $CO_2$ is desorbed from said scrubbing solution,
the improvement which comprises providing at least one sterically-hindered amine in said scrubbing solution as said amine and operating said process at conditions whereby the difference between the moles of $CO_2$ absorbed at the end of step (1) (absorption step) and the moles of $CO_2$ absorbed at the end of step (2) (desorption step) would be greater at the thermodynamic equilibrium of the vapor-liquid system (as determined from the vapor-liquid equilibrium isotherm of the reaction mixture) than in a $CO_2$ gas scrubbing process utilizing a nonaqueous organic solvent and an amine wherein diisopropanolamine is the only amine utilized under similar conditions of gaseous feed composition, scrubbing solution composition, temperatures and pressures.

16. The process of claim 15 wherein the sterically hindered amine is a compound which contains at least one secondary amino group attached to a secondary or tertiary carbon atom or a primary amino group attached to a tertiary carbon atom and at least one water-solubilizing group.

17. The process of claim 15 wherein the sterically hindered amine is an amino alcohol 18. The process of claim 15 wherein the sterically hindered amine is selected from the group consisting of 3-amino-3-methyl-1-butanol, 2-amino-2-methyl-1-propanol, 2-piperidine methanol and 2-piperidine ethanol.

19. The process of claim 15 wherein the sterically hindered amine is selected from the group consisting of 2-piperidine methanol and 2-piperidine ethanol.

20. The process of claim 15 wherein said nonaqueous organic solvent is selected from the group consisting of sulfolane, N-methyl-pyrrolidone, dimethyl sulfoxide, polyalkylene glycols and their mono- and dialkyl ethers, formamide and hexamethyl phosphoramide.

21. The process of claim 15 wherein said nonaqueous solvent is sulfolane.

22. The process of claim 15 wherein said absorbent additionally contains from 0.5 to 10 moles of $H_2O$ per mole of amine in the nonaqueous scrubbing solution.

23. The process of claim 15 wherein said absorbent additionally include an additive selected from the group consisting of antifoaming agents, antioxidants, corrosion inhibitors and mixtures thereof.

24. The process of claim 15 wherein the scrubbing solution from step (2) (desorption step) is reused to absorb a feed containing $CO_2$.

25. The process of claim 1 wherein said normally gaseous feed contains $CO_2$ in combination with $H_2S$ and/or COS.

26. The process of claim 4 wherein said sterically hindered amine is an asymmetrical sterically hindered primary amino alcohol having a boiling point of at least 100° C. and said solvent is a cyclotetramethylene sulfone.

27. The process of claim 13 wherein said normally gaseous feed contains $CO_2$ in combination with $H_2S$ and/or COS.

28. The process of claim 15 wherein said gaseous feed contains $CO_2$ in combination with $H_2S$ and/or COS.

29. The process of claim 1 wherein said normally gaseous feed is selected from the group consisting of sour natural gas, hydrogen synthesis gas or refinery gas.

30. The process of claim 1 wherein said amine-solvent liquid absorbent is comprised of 50–60 weight % of amines, 1 to 15 weight % of solvent and water.

31. The process of claim 1 wherein said amine-solvent liquid absorbent is comprised of about 15 weight % of the amine, about 75 weight % of solvent and about 10 weight % water.

32. The process of claim 1 wherein said amine-solvent liquid absorbent is comprised of about 45 weight % of amines, about 40 weight % of the solvent and the balance about 15 weight % water.

33. The process of claim 1 wherein said amine-solvent liquid absorbent is comprised of 10 to about 45 weight % of amines, 1 to about 35 weight % water and the balance being at least one organic solvent.

34. The process of claim 1 wherein said amine-solvent liquid absorbent is comprised of 45 to about 65 weight % amines, 15 to about 35 weight % water, and essentially all of the balance being at least one organic solvent for the amine.

* * * * *